United States Patent
Chiu

(10) Patent No.: US 9,808,126 B2
(45) Date of Patent: Nov. 7, 2017

(54) SHOWERHEAD WATER COLLECTION DEVICE

(71) Applicant: Hsi-Ying Chiu, Taoyuan (TW)

(72) Inventor: Hsi-Ying Chiu, Taoyuan (TW)

(73) Assignee: SAVE WATER DOT CO., LTD., Taoyuan (TW)

( * ) Notice: Subject to any disclaimer, the term of this patent is extended or adjusted under 35 U.S.C. 154(b) by 0 days.

(21) Appl. No.: 15/299,569

(22) Filed: Oct. 21, 2016

(65) Prior Publication Data

US 2017/0181583 A1    Jun. 29, 2017

(30) Foreign Application Priority Data

Dec. 23, 2015 (TW) .............................. 104220652 U

(51) Int. Cl.
*A47K 3/022* (2006.01)
*A47K 3/28* (2006.01)
*B05B 15/06* (2006.01)
*G01K 1/02* (2006.01)
*B05B 1/18* (2006.01)

(52) U.S. Cl.
CPC ............ *A47K 3/281* (2013.01); *B05B 15/061* (2013.01); *G01K 1/028* (2013.01); *B05B 1/18* (2013.01)

(58) Field of Classification Search
CPC ...... A47K 3/281; A47K 3/288; B05B 15/061; B05B 1/18; B05B 1/185; G01K 1/028; E03C 1/06; A61H 9/0021; F16L 37/48
USPC .... 4/597, 601, 602, 603, 567, 615, 616, 676
See application file for complete search history.

(56) References Cited

U.S. PATENT DOCUMENTS

| | | | | | |
|---|---|---|---|---|---|
| 2,539,976 | A | * | 1/1951 | Samson | A47K 3/281 239/511 |
| 3,162,193 | A | * | 12/1964 | Zacks | A61M 3/0241 4/597 |
| 3,465,968 | A | * | 9/1969 | Halpern | B05B 1/262 239/504 |
| 3,847,159 | A | * | 11/1974 | Hofer | B05B 1/267 239/507 |
| 5,076,709 | A | * | 12/1991 | Tognotti | A47K 3/281 374/141 |
| 5,160,197 | A | * | 11/1992 | Klose | E03C 1/0409 374/147 |

(Continued)

*Primary Examiner* — Benjamin R Shaw
(74) *Attorney, Agent, or Firm* — Jackson IPG PLLC; Demian K. Jackson

(57) ABSTRACT

A showerhead water collection device includes an arc hanging element and a pipeline. The arc hanging element includes a fastener, an arc hook, a temperature sensing element, a temperature display device and a through hole. The fastener is for fixing the arc hanging element to a seat or a wall; the arc hook is for hanging the showerhead; the temperature sensing element is for sensing the temperature of water outputted from the showerhead and displaying the water temperature on the temperature display device; the through hole is formed at the bottom inside the arc hanging element for collecting the water outputted from the showerhead; and the pipeline is coupled to the bottom of the arc hanging element for receiving the water outputted from the through hole through the connecting portion. The invention has the effects of fixing the showerhead, facilitating water connection, and preventing unnecessary waste of water resource.

6 Claims, 6 Drawing Sheets

(56) References Cited

U.S. PATENT DOCUMENTS

| | | | | |
|---|---|---|---|---|
| 6,315,220 | B1* | 11/2001 | Grubb | E03C 1/086 |
| | | | | 239/588 |
| 7,889,187 | B2* | 2/2011 | Freier | G05D 23/1393 |
| | | | | 251/129.01 |
| 8,566,973 | B2* | 10/2013 | Duczak | A01K 13/001 |
| | | | | 119/603 |
| 9,080,320 | B1* | 7/2015 | Taylor | E03C 1/0408 |
| 2007/0047617 | A1* | 3/2007 | Thorne | G01K 1/02 |
| | | | | 374/163 |
| 2009/0106891 | A1* | 4/2009 | Klicpera | B05B 12/004 |
| | | | | 4/605 |
| 2009/0173388 | A1* | 7/2009 | Sever | E03C 1/08 |
| | | | | 137/1 |
| 2009/0217941 | A1* | 9/2009 | Shepherd | B05B 15/025 |
| | | | | 134/2 |
| 2009/0293189 | A1* | 12/2009 | Somerville | B05B 1/18 |
| | | | | 4/597 |
| 2011/0210188 | A1* | 9/2011 | Yao | B05B 1/18 |
| | | | | 239/71 |
| 2013/0219613 | A1* | 8/2013 | Ojea | B05B 1/18 |
| | | | | 4/615 |
| 2013/0333764 | A1* | 12/2013 | Wright | E03C 1/02 |
| | | | | 137/1 |
| 2013/0340162 | A1* | 12/2013 | Peel | F17D 1/00 |
| | | | | 4/676 |
| 2016/0016190 | A1* | 1/2016 | Buswell | B05B 15/025 |
| | | | | 220/475 |

* cited by examiner

SHOWERHEAD WATER COLLECTION DEVICE

FIELD OF THE INVENTION

The present invention relates to a showerhead water collection device, in particular to the showerhead water collection device capable of recycling the initially outputted water primarily by the hardware design of connecting the water collection device installed to a seat or a wall with a pipeline to collect the cold water initially flowing out from the showerhead, and displaying the water temperature indication on a temperature display device, so as to protect users from being burned or injured while testing water temperature by hands and achieve the effects of fixing the showerhead into position and facilitating water collection without wasting water resources.

BACKGROUND OF THE INVENTION

1. Description of the Related Art

In the past, people generally take bath in form of bubble bath or shower. There was a substantial change after the showerhead came out, and people takes bath in form of bathing, and the present existing showerhead usually includes a hollow handle installed to a water outlet and a soft tube at an end of the handle is connected to a faucet, so that the water flow can be sprayed out in form of splashes or streams from the water outlet and provided for bathing. However, the water input of some equipments comes from a water pipe or a water tower, so that the path of the input water of the showerhead is too long or the users have to wait for a long time before the water heater heats up the water and supplies hot water, since the water outputted from the showerhead is usually cold water. In addition, most users let the cold water run freely and drain into the outlet, and thus incurring unnecessary waste of water resource. To guarantee the use of hot water, the temperature of the water outputted from the water outlet of the showerhead is controlled by using hands or feet to test the water temperature, but such method has potential danger. If the temperature of the outputted water is too high, and the user does not respond immediately, the user's skin may be burned before taking action to adjust the water temperature. Therefore, the conventional showerhead is often operated improperly and scald injuries may occur easily. Therefore, it is an important subject for related manufacturers and designers to develop and design a showerhead capable of reusing the outputted water and timely reminding users about the water temperature of the showerhead, so as to achieve the effect of saving water resources and preventing scald injuries.

2. Summary of the Invention

In view of the drawbacks of the prior art, the inventor of the present invention based on years of experience in the related industry to conduct extensive researches and experiments, and finally developed a showerhead water collection device capable of recycling the initially water outputted from the showerhead, wherein the invention adopts the hardware design of connecting a water collection device of a seat or a wall with a pipeline to achieve the effects of effectively collecting the cold water initially flowing out from the showerhead, providing a temperature indication by a temperature display device to skip the dangerous action of testing the water temperature by hands, fixing the showerhead into position, and conveniently collecting water without wasting water resources.

To achieve the aforementioned objective, the present invention discloses a showerhead water collection device, providing a hanging position for fixing a showerhead, and comprising: an arc hanging element, substantially a semi-circular arc hollow casing, including a fastener, an arc hook, a temperature sensing element, a temperature display device electrically coupled to the temperature sensing element, and at least one through hole, wherein the fastener is installed inside the arc hanging element and provided for fixing the arc hanging element to a seat or a wall, and the arc hook is installed at an opening of the arc hanging element and provided for hanging the showerhead, and the temperature sensing element is installed inside the arc hanging element and provided for sensing the temperature of water outputted from the showerhead and displaying the water temperature from the temperature display device, and the through hole is formed at the bottom edge inside the arc hanging element and provided for collecting the water outputted from the showerhead; and a pipeline, coupled to a lower end portion of the arc hanging element, wherein the pipeline undertakes the water outputted from the through hole through a connecting portion.

In a preferred embodiment of the present invention, the fastener is a screw, and at least one through hole of the arc hanging element is provided for fixing the arc hanging element onto the seat or the wall.

In a preferred embodiment of the present invention, the arc hook further includes a protective pad for preventing the showerhead from being scratched or damaged.

In a preferred embodiment of the present invention, the through hole is tapered from the arc hanging element to the pipeline, and the through hole is substantially in a funnel shape.

In a preferred embodiment of the present invention, the connecting portion is substantially in a funnel shape and tapered from the arc hanging element to the pipeline.

In a preferred embodiment of the present invention, the pipeline further includes a tie ring for tying the pipeline onto the connecting portion.

The invention adopts the design of connecting a water collection device of a seat or a wall with a pipeline to achieve the effects of effectively collecting the cold water initially flowing out from the showerhead, providing a temperature indication by a temperature display device to skip the dangerous action of testing the water temperature by hands, fixing the showerhead into position, and conveniently collecting water without wasting water resources. In addition, the water collection device of the present invention suitable of being hanged inside a showerhead is provided for collecting cold water (which is not suitable for bathing) initially flowing out from the showerhead and returning the cold water for reuse, so as to achieve the effects of saving water, facilitating water collection, and avoiding unnecessary waste of water resource. Finally, the showerhead water collection device of the present invention uses a temperature sensing element installed in the arc hanging element to sense the temperature of the cold water initially flowing out from the showerhead and display the water temperature from a temperature display device installed outside the arc hanging element, so that a bather can observe the temperature of water outputted from the showerhead through the temperature display device, so as to achieve the effects of preventing the danger of being burned or injured when the bather tests the water temperature directly by hands and protecting the user's safety.

DESCRIPTION OF THE PREFERRED EMBODIMENTS

Figure 1:
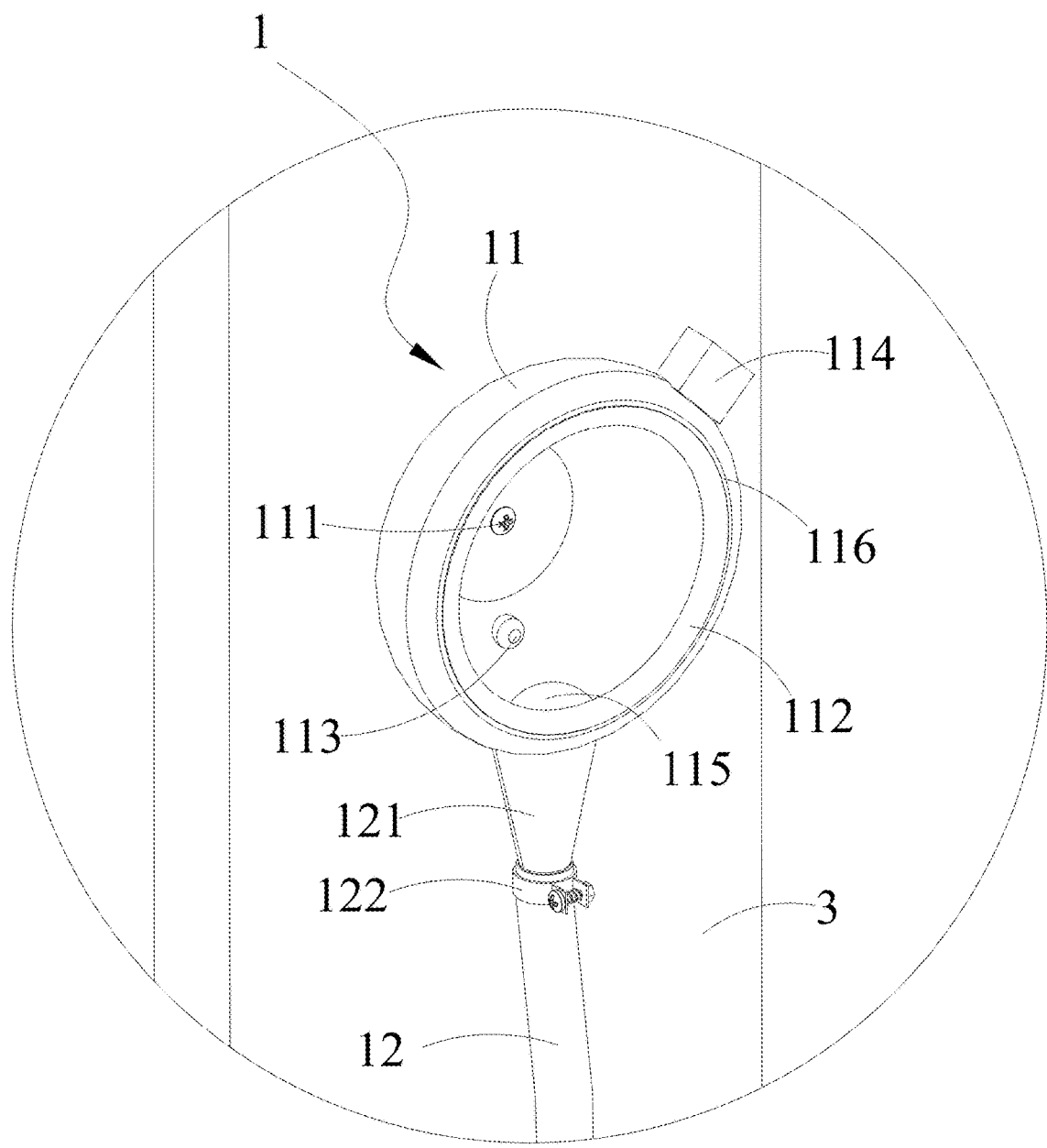
FIG. 1 is a perspective view of a showerhead water collection device of a preferred embodiment of the present invention.
Figure 2:
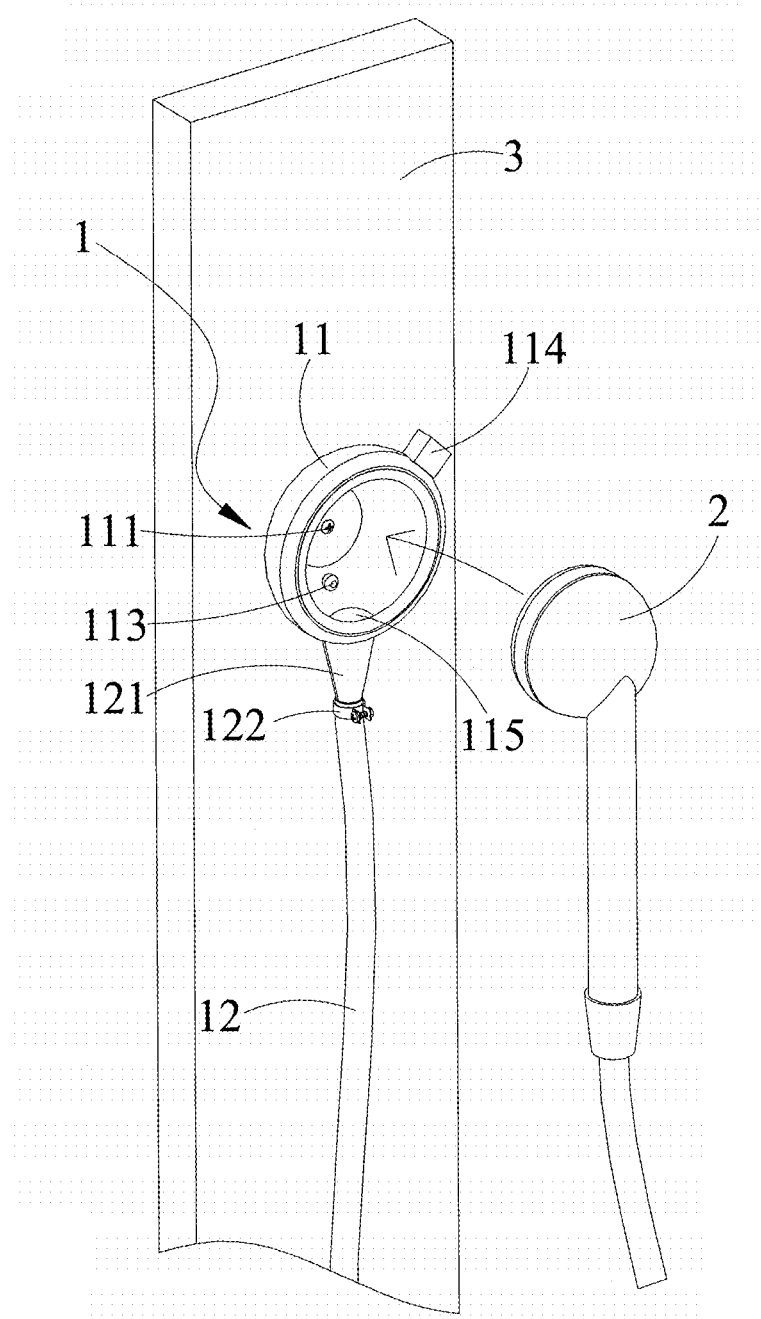
FIG. 2 is a schematic view of a showerhead with a showerhead water collection device in accordance with a preferred embodiment of the present invention.
Figure 3:
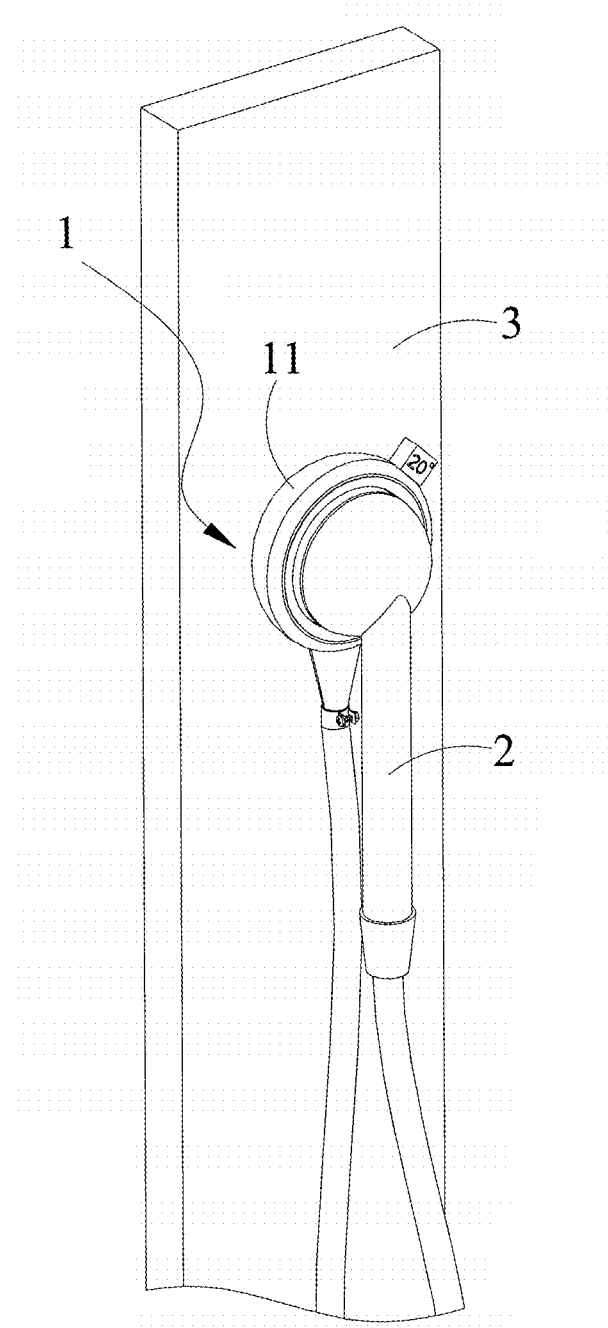
FIG. 3 is a schematic view of hanging a showerhead with a showerhead water collection device in accordance with a preferred embodiment of the present invention.
Figure 4:
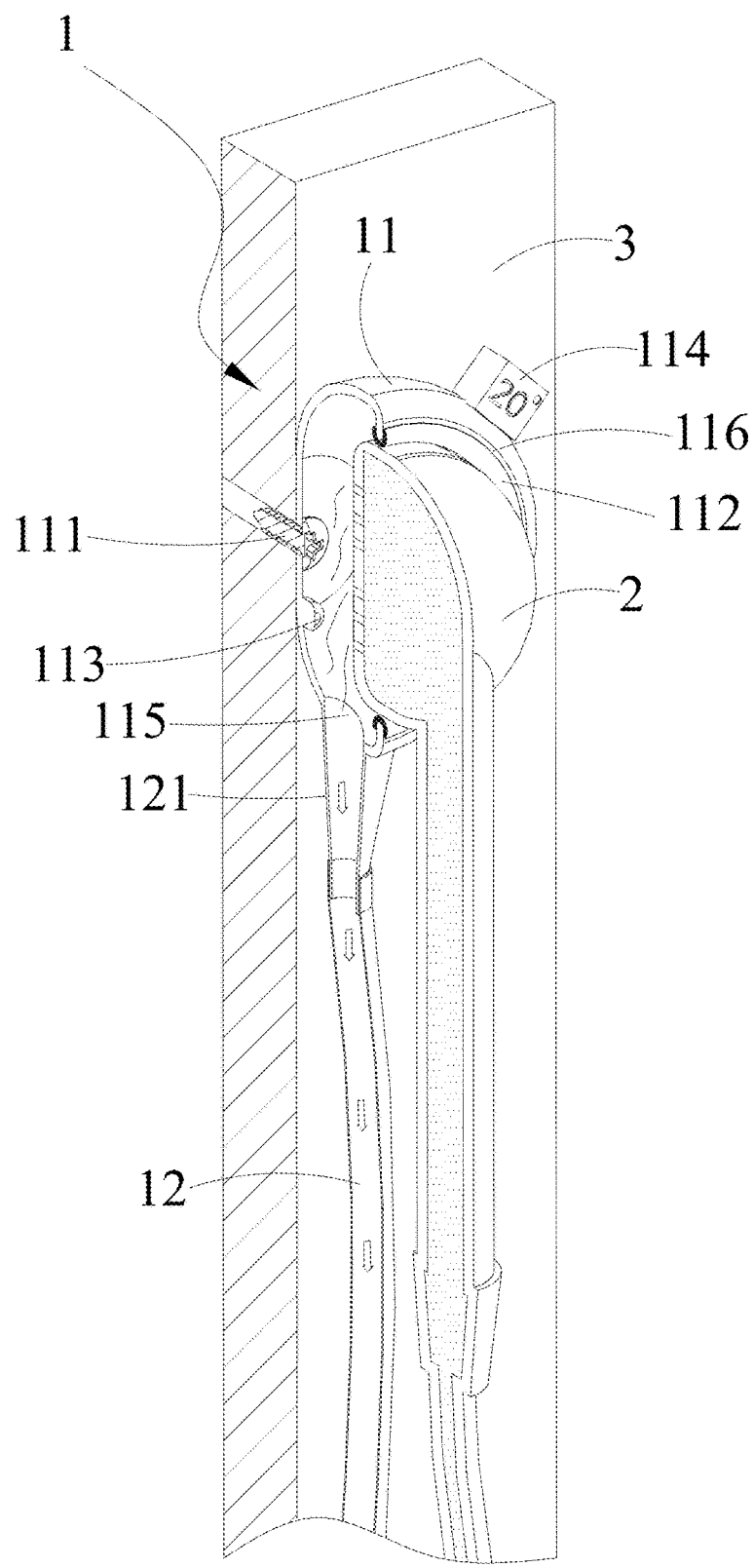
FIG. 4 is a cross-sectional view of hanging a showerhead with a showerhead water collection device in accordance with a preferred embodiment of the present invention.

The above and other objects, features and advantages of this disclosure will become apparent from the following detailed description taken with the accompanying drawings.

With reference to FIGS. 1 to 4 for a perspective view, a schematic view of installing a showerhead, a schematic view of hanging a showerhead and a cross-sectional view of a showerhead water collection device in accordance with a preferred embodiment of the present invention respectively, the showerhead water collection device (1) comprises a hanging position for fixing a showerhead (2), and the showerhead water collection device (1) comprises the following components:

An arc hanging element (11) is substantially a semi-circular arc hollow casing comprising a fastener (111), an arc hook (112), a temperature sensing element (113), a temperature display device (114) electrically coupled to the temperature sensing element (113), and at least one through hole (115), wherein the fastener (111) is installed inside the arc hanging element (11) and provided for fixing the arc hanging element (11) to a seat (3) or a wall (not shown in the figure), and the arc hook is installed at an opening of the arc hanging element (11) and provided for hanging the showerhead (2), and the temperature sensing element (113) is installed inside the arc hanging element (11) and provided for sensing the water outputted from the showerhead (2) and displaying the water temperature on the temperature display device (114), and the through hole (115) is formed at a lower edge inside the arc hanging element (11) and provided for collecting water outputted from the showerhead (2). In a preferred embodiment of the present invention, the fastener (111) is a screw, and at least one through hole (not shown in the figure) is formed on the arc hanging element (11) and provided for fixing the arc hanging element (11) onto a seat (3) or a wall. In addition, the arc hook (112) further includes a protective pad (116) for preventing the showerhead (2) hanged on the arc hook (112) from being scratched or damaged. In addition, the through hole (115) is tapered from the arc hanging element (11) to the pipeline (12), wherein the through hole (115) is substantially in a funnel shape to facilitate the water outputted from the showerhead (2) to flow smoothly out from the pipeline (12), so as to prevent the water from overflowing from the arc hanging element (11).

A pipeline (12) is coupled to a lower end portion of the arc hanging element (11), wherein the pipeline (12) uses a connecting portion (121) to receive the water outputted from the through hole (115). In addition, the connecting portion (121) is substantially in a funnel shape and tapered from the arc hanging element (11) to the pipeline (12), so that the water outputted from the showerhead (2) and collected by the through hole (115) can flow out from the pipeline (12). Further, the pipeline (12) includes a tie ring (122) for tying the pipeline (12) onto the connecting portion (121) to facilitate the water outputted from the showerhead (2) to flow out smoothly.

To make it easy for our examiner to understand the objectives, characteristics and effects of the present invention, the following embodiments of the showerhead water collection device of the present invention are provided for the purpose of illustrating the invention, but not intended for limiting the scope of the present invention.

Figure 5:
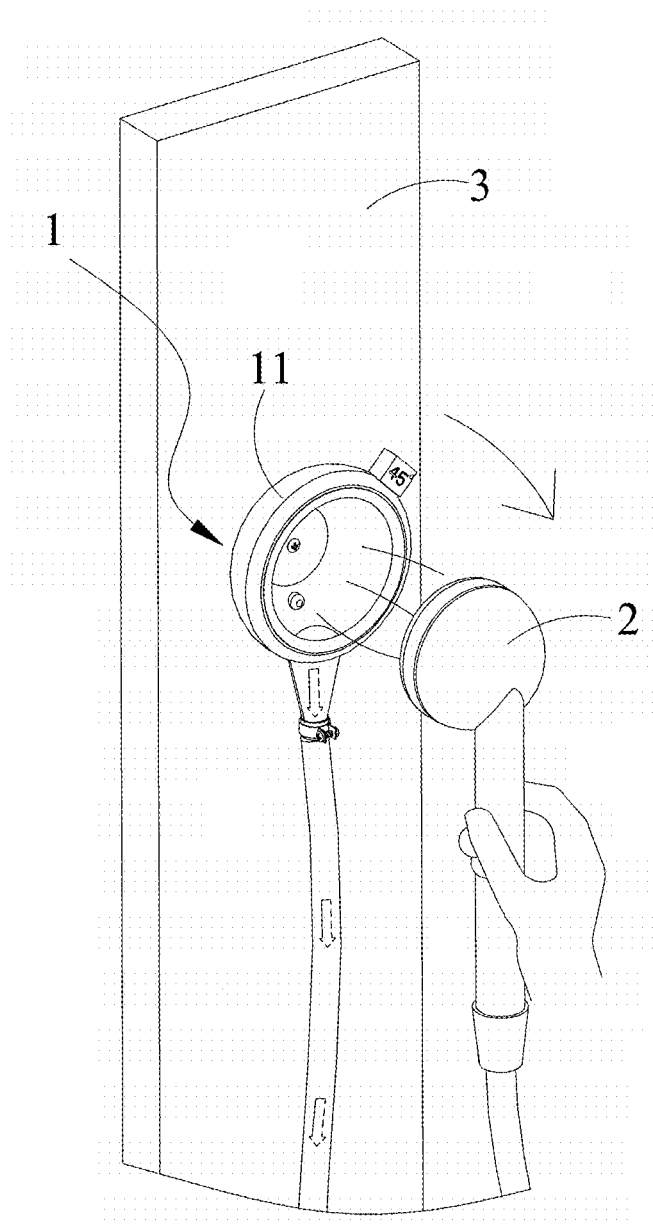
FIG. 5 is a schematic view of an operation of a showerhead water collection device in accordance with a preferred embodiment of the present invention.
Figure 6:
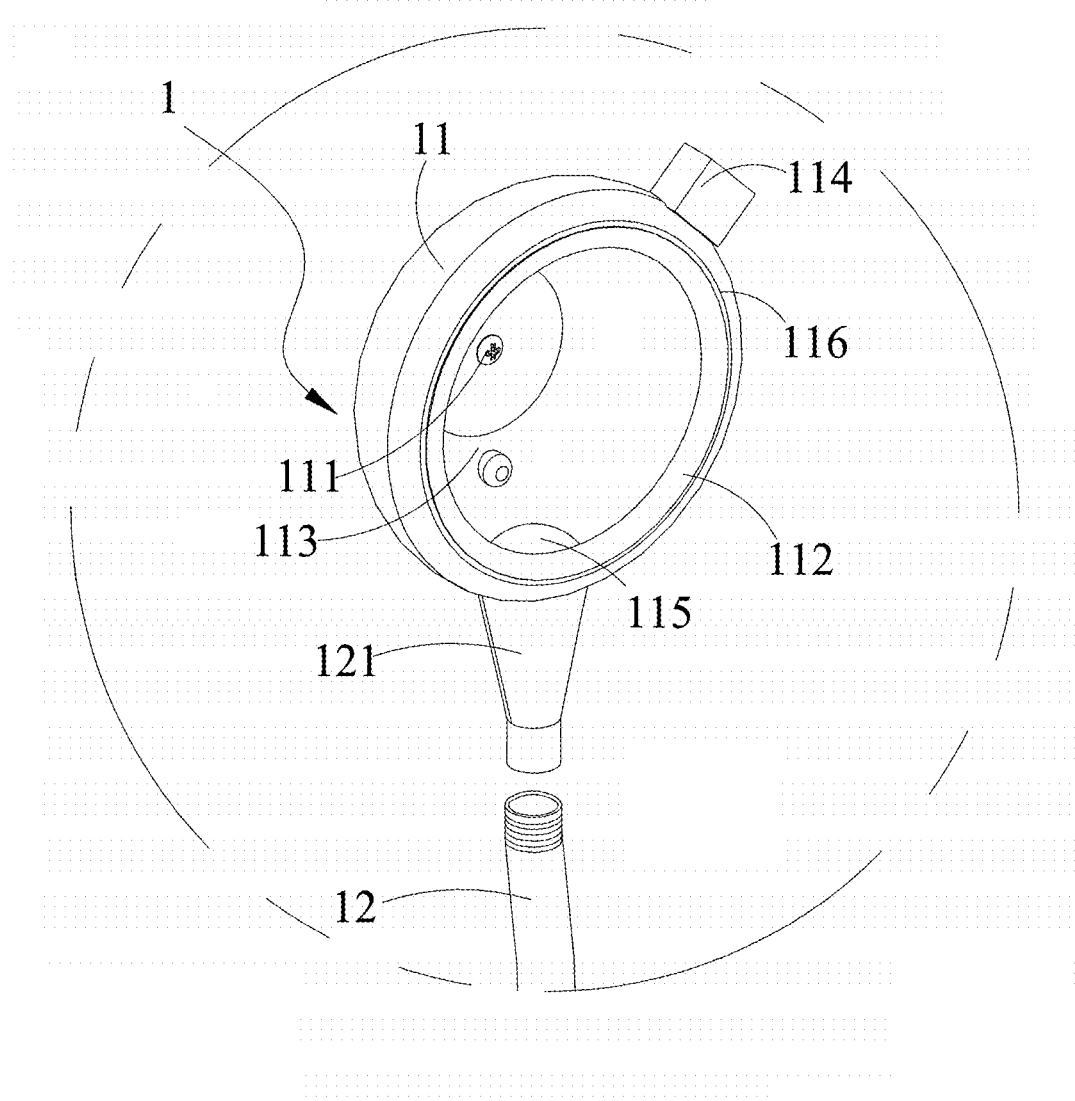
FIG. 6 is a schematic view of a showerhead water collection device connected to a pipeline in accordance with a preferred embodiment of the present invention.

With reference to FIGS. 5 and 6 for a schematic view of operating a showerhead water collection device and a schematic view of connecting a pipeline in accordance with a preferred embodiment of the present invention respectively, when a user wants to take a shower, the user may install the showerhead water collection device (1) to the showerhead (2), so that the showerhead water collection device (1) can collect the cold water initially flowing out from the showerhead (2), and has the advantages of fixing the showerhead (2) into position, facilitating the water collection, and preventing unnecessary waste of water resource. Firstly, a screw of a fastener (111) is used, and at least one through hole inside an arc hanging element (11) is provided for fixing the arc hanging element (11) onto a seat (3) or a wall, wherein the arc hanging element (11) is substantially a semi-circular arc hollow casing, and the arc hanging element (11) comprises an arc hook (112), a temperature sensing element (113), a temperature display device (114) electrically coupled to the temperature sensing element (113), and at least one through hole (115). Wherein, the arc hook is installed at an opening of the arc hanging element (11) and provided for hanging the showerhead (2), and the temperature sensing element (113) is installed inside the arc hanging element (11) and provided for sensing the temperature of water outputted from the showerhead (2) and displaying the water temperature on the temperature display device (114), and the through hole (115) is formed at a lower edge inside the arc hanging element (11) and provided for collecting the water outputted from the showerhead (2), and then a connecting portion (121) is provided for connecting a pipeline (12) to a lower end portion of the arc hanging element (11) to receive the water outputted from the through hole (115). Before the user uses the showerhead (2) for bathing, the user may hang the showerhead (2) onto the arc hanging element (11), and open the switch of the showerhead (2) to let water flow out, and the water initially outputted from the showerhead (2) flows out from the through hole (115 into the pipeline (12) and then the water is collected, so that the invention has the effects of fixing the showerhead (2) into position, facilitating the water collection, and preventing unnecessary waste of water resource. The temperature of the outputted water is sensed by the temperature sensing element (113) and displayed on the temperature display device (114), so that users may know about the temperature of the water outputted from the showerhead (2) through the temperature display device (114) to prevent the danger of being burned or injured while testing the water temperature hands, so as to achieve the effect of protecting the users.

Compared with the conventional technologies and products, the present invention has the following advantages:

1. The showerhead water collection device of the present invention adopts the hardware design of connecting a water collection device of a seat or a wall with a pipeline to achieve the effects of effectively collecting the cold water initially flowing out from the showerhead, providing a temperature indication by a temperature display device to skip the dangerous action of testing the water temperature by hands, fixing the showerhead into position, and conveniently collecting water without wasting water resources.

2. The showerhead water collection device of the present invention is a bathroom product that uses a water collection device hanged inside the showerhead for collecting the cold water (which is not suitable for bathing) initially flowing out from the showerhead and returns and reuses the cold water, so as to achieve the effects of saving water, facilitating the water collection and preventing unnecessary waste of water resource.

3. The showerhead water collection device of the present invention uses the temperature sensing element installed inside the arc hanging element for sensing the temperature of cold water initially flowing out from the showerhead and displays the water temperature on the temperature display device installed outside the arc hanging element, so that a bather can watch the temperature of water outputted from the showerhead by looking at the temperature display device, so as to achieve the effects of preventing the danger of being burned or injured when the bather tests the water temperature directly by hands and protecting the user's safety.

What is claimed is:

1. A showerhead water collection device, providing a hanging position for fixing a showerhead, and comprising:
    an arc hanging element, substantially a semi-circular arc hollow casing, including a fastener, an arc hook, a temperature sensing element, a temperature display device electrically coupled to the temperature sensing element, and at least one through hole, wherein the fastener is installed inside the arc hanging element and provided for fixing the arc hanging element to a seat or a wall, and the arc hook is installed at an opening of the arc hanging element and provided for hanging the showerhead, and the temperature sensing element is installed inside the arc hanging element and provided for sensing the temperature of water outputted from the showerhead and displaying the water temperature from the temperature display device, and the through hole is formed at the bottom edge inside the arc hanging element and provided for collecting the water outputted from the showerhead; and
    a pipeline, coupled to a lower end portion of the arc hanging element, wherein the pipeline undertakes the water outputted from the through hole through a connecting portion.

2. The showerhead water collection device according to claim 1, wherein the fastener is a screw and at least one through hole of the arc hanging element is provided for fixing the arc hanging element onto the seat or the wall.

3. The showerhead water collection device according to claim 1, wherein the arc hook further includes a protective pad for preventing the showerhead from being scratched or damaged.

4. The showerhead water collection device according to claim 1, wherein the through hole is tapered from the arc hanging element to the pipeline and the through hole is substantially in a funnel shape.

5. The showerhead water collection device according to claim 1, wherein the connecting portion is substantially in a funnel shape and tapered from the arc hanging element to the pipeline.

6. The showerhead water collection device according to claim 1, wherein the pipeline further includes a tie ring for tying the pipeline onto the connecting portion.

* * * * *